(12) United States Patent
Cianciotto et al.

(10) Patent No.: US 7,171,097 B2
(45) Date of Patent: Jan. 30, 2007

(54) HEX TUBE LIGHT HOMOGENIZER SPLITTER

(75) Inventors: Frank Cianciotto, Tehachapi, CA (US); George Butler, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/371,878

(22) Filed: Mar. 8, 2006

(65) Prior Publication Data

US 2006/0285815 A1    Dec. 21, 2006

Related U.S. Application Data

(63) Continuation of application No. 11/154,079, filed on Jun. 15, 2005, now Pat. No. 7,113,684.

(51) Int. Cl.
*G02B 6/10*    (2006.01)
(52) U.S. Cl. .................... 385/133; 385/46; 385/146
(58) Field of Classification Search ............... 385/46, 385/133, 146
See application file for complete search history.

(56) References Cited

U.S. PATENT DOCUMENTS

| | | | |
|---|---|---|---|
| 4,632,513 A | 12/1986 | Stowe et al. | |
| 4,964,692 A | 10/1990 | Prescott | |
| 5,054,874 A | 10/1991 | Hill et al. | |
| 5,375,185 A | 12/1994 | Hermsen et al. | |
| 5,553,183 A | 9/1996 | Bechamps | |
| 5,604,837 A * | 2/1997 | Tanaka | ......................... 385/147 |
| 5,701,191 A | 12/1997 | Iwasaki | |
| 5,828,505 A | 10/1998 | Farmiga | |
| 6,038,361 A | 3/2000 | Yoshikawa et al. | |
| 6,104,857 A | 8/2000 | Ishiharadsa | |

(Continued)

FOREIGN PATENT DOCUMENTS

JP    11017969    1/1999

(Continued)

OTHER PUBLICATIONS

U.S. Appl. No. 10/744,922, filed Dec. 23, 2003, Cianciotto.

(Continued)

*Primary Examiner*—Sung Pak
*Assistant Examiner*—Tina M. Wong
(74) *Attorney, Agent, or Firm*—Ingrassia Fisher & Lorenz, P.C.

(57) ABSTRACT

A right angle light diverter includes a hexagonal tube that is bent at a right angle that is coated with a highly reflective coating on the inside surface. An incoming light beam may be homogenized upon entering an input port of the hexagonal tube and may be evenly diverted at a right angle at a reflection section while the homogenized profile may be maintained. A right angle optical splitter may include at least one additional output section. An incoming light beam may be homogenized and may be split into at least two outgoing beams that may be diverted at right angles at reflection sections. The right angle light diverter and the right angle optical splitter may be suitable for, but not limited to, applications in aircraft industry, both military and commercial. They may be used, for example, in connection with airborne laser programs, in commercial airplanes, and in military jets.

3 Claims, 3 Drawing Sheets

U.S. PATENT DOCUMENTS

| | | |
|---|---|---|
| 6,112,004 A | 8/2000 | Colvin |
| 6,149,289 A | 11/2000 | Karamitsu et al. |
| 6,324,330 B1 * | 11/2001 | Stites .................... 385/133 |
| 6,332,688 B1 * | 12/2001 | Magarill ................ 359/858 |
| 6,366,308 B1 * | 4/2002 | Hawryluk et al. ........ 347/256 |
| 6,595,673 B1 | 7/2003 | Ferrante et al. |
| 6,771,870 B2 * | 8/2004 | Strobl et al. ............. 385/133 |
| 6,792,190 B2 | 9/2004 | Xin et al. |
| 6,801,701 B1 | 10/2004 | Montgomery et al. |
| 6,857,764 B2 * | 2/2005 | Kohno .................... 362/268 |
| 2001/0005222 A1 | 6/2001 | Yamaguchi |
| 2004/0137089 A1 | 7/2004 | Dinan |
| 2004/0137189 A1 | 7/2004 | Tellini et al. |
| 2005/0084210 A1 | 4/2005 | Cha |
| 2005/0162853 A1 | 7/2005 | Jain |
| 2005/0265683 A1 | 12/2005 | Cianciotto |

FOREIGN PATENT DOCUMENTS

| | | |
|---|---|---|
| JP | 11250227 | 9/1999 |

OTHER PUBLICATIONS

U.S. Appl. No. 11/122,205, filed May 3, 2005, Frank Cianciotto, "Light Mixing and Homogenizing Apparatus and Method", pending.

U.S. Appl. No. 11/180,285, filed Jul. 12, 2005, Frank Cianciotto, "Tri to Hex Light Mixer and Homogenizer", pending.

U.S. Appl. No. 11/199,826, filed Aug. 9, 2005, Frank Cianciotto, "Systems and Methods for distributing signals communicated on fiber optic transmission lines", pending.

U.S. Appl. No. 11/126,974, filed May 11, 2005, Frank Cianciotto, "Light Mixing Homogenizer Apparatus and Method", pending.

* cited by examiner

HEX TUBE LIGHT HOMOGENIZER SPLITTER

CROSS REFERENCE TO RELATED APPLICATIONS

The present application is a continuation application of U.S. patent application Ser. No. 11/154,079 now U.S. Pat. No. 7,113,684, filed Jun. 15, 2005. The present application is related to the following co-pending United States patent application: "Hex Tube Light Homogenizer System and Method", Ser. No. 10/744,922, filed Dec. 23, 2003.

BACKGROUND OF THE INVENTION

The present invention generally relates to light transmitting devices and systems and, more particularly, to a right angle light diverter, to a right angle optical splitter, and to a method for splitting an initial light source into numerous light beams.

Optical fibers are transparent thin fibers, such as long, thin strands of optically pure glass, for transmitting light. Typically, optical fibers are arranged in bundles, such as optical cables, and are used in various industries to transmit light or light signals, such as digital information, over long distances. Generally, two types of optical fibers exist, single-mode fibers and multi-mode fibers. Single-mode fibers transmit infrared laser light (wavelength=1,300 to 1,550 nanometers), whereas multi-mode fibers transmit infrared light (wavelength=850 to 1,300 nm) from light-emitting diodes (LED's). Some optical fibers can be made from plastic. These fibers have a large core (0.04 inches or 1 mm diameter) and transmit visible red light (wavelength=650 nm) from LED's. When using optical fibers, the optical cables need to be installed by curving the optical cables in relatively large diameters. Generally, it is not possible to bend an optical fiber, for example, at a 90° angle.

Many applications require a homogenous light beam. Therefore, a light beam coming out of an optical fiber is often sent through an optical light homogenizer to ensure beam conformity. Typically, a hexagonal glass rod manufactured out of a piece of specialized glass, such as quartz glass, is used for this purpose. The hexagonal glass rod needs to be highly polished on both ends and needs to be coated on the outside with a highly reflective coating, which creates high manufacturing cost. Furthermore, the hexagonal glass rod is highly fragile and needs to be handled carefully, which might be difficult to realize in industrial applications. Still further, the light passing through the hexagonal glass rod may lose some of its intensity and the hexagonal glass rod cannot be adjusted to different wavelengths.

Some fiber optic applications, for example, data links, require more than simple point-to point connections. Fiber optic components that can redistribute, split or combine optical signals throughout a fiber optics system may be required for these applications. One type of fiber optic components that allow for redistribution of optical signals is a fiber optic coupler. A fiber optic coupler is a device that can distribute the optical signal from one fiber among two or more fibers. A fiber optic coupler can also combine the optical signal from two or more fibers into a single fiber. Fiber optic couplers attenuate the signal resulting in a loss of intensity because the input signal is divided among the output ports. Fiber optic couplers can be either active or passive devices. The difference between active and passive couplers is that a passive coupler redistributes the optical signal without optical-to-electrical conversion. Active couplers are electronic devices that split or combine the signal electrically and use fiber optic detectors and sources for input and output. An optical splitter is a passive device that typically splits the optical power carried by a single input fiber into two output fibers. The input optical power is normally split evenly between the two output fibers. However, an optical splitter may distribute the optical power carried by input power in an uneven manner. In this case, an optical splitter may split most of the power from the input fiber to one of the output fibers and only a small amount of the power into the secondary output fiber. Usually, optical splitters have low transmission efficiency resulting in a loss of optical power due to their design.

As can be seen, there is a need for a fiber optic component that enables bending a light beam traveling through an optical fiber at a right angle. Furthermore, there is a need for a fiber optic component that can be used as an optical splitter and as an optical homogenizer. Still further, there is a need for a method for distributing the optical signal from one fiber among two or more fibers without losing optical power.

There has, therefore, arisen a need to provide a light diverter that enables bending a light beam at a right angle while producing and maintaining a homogenous light profile. There has further arisen a need to provide a fiber optic component and method that enables splitting optical power carried by a single input fiber between two or more output fibers without losing optical power. There has still further arisen a need for a fiber optic component for homogenizing and splitting optical signals that is inexpensive and that can be used in rugged environments.

SUMMARY OF THE INVENTION

In one aspect of the present invention, a right angle light diverter comprises a hexagonal tube that has an inside surface and is bent at a right angle. The hexagonal tube includes an input port located at a one end of the hexagonal tube, an output port located at the opposite end of the hexagonal tube, an input section following the input port, an output section preceding the output port, a reflection section positioned at a 45° reflection angle across from the bending point, and a highly reflective coating applied to the inside surface of the hexagonal tube. The input section and the output section intersect at a bending point forming the right angle.

In another aspect of the present invention, a right angle optical splitter comprises a hexagonal tube that has an inside surface and a diameter. The hexagonal tube includes: an input port located at a one end of the hexagonal tube, an input section having a length and following the input port, a first output section having a length, a first output port following the first output section, a second output section having a length, a first reflection section positioned across from the first bending point at a first 45° reflection angle, a second reflection section positioned across from the second bending point at a second 45° reflection angle, and a highly reflective coating applied to the inside surface of the hexagonal tube. The first output section intersects with the input section at a first bending point and forms a first right angle with the input section. The second output section intersects with the input section at a second bending point and forms a second right angle with the input section.

In a further aspect of the present invention, a method for splitting a light beam at a right angle comprises the steps of: homogenizing an incoming light beam upon entering an input port of an hexagonal tube; splitting the homogenized light beam at a first reflection section and at a second reflection section of the hexagonal tube into a first outgoing light beam and into a second outgoing light beam; diverting the first outgoing light beam at a first right angle at the first reflection section; diverting the second outgoing light beam at a second right angle at the second reflection section; maintaining homogenization of the first outgoing light beam and of the second outgoing light beam; providing the first homogenized outgoing light beam at a first output port of the hexagonal tube; and providing the second homogenized outgoing light beam at a second output of the hexagonal tube. The highly reflective coating is applied to the inside surface of the hexagonal tube.

These and other features, aspects and advantages of the present invention will become better understood with reference to the following drawings, description and claims.

DETAILED DESCRIPTION OF THE INVENTION

Figure 1:
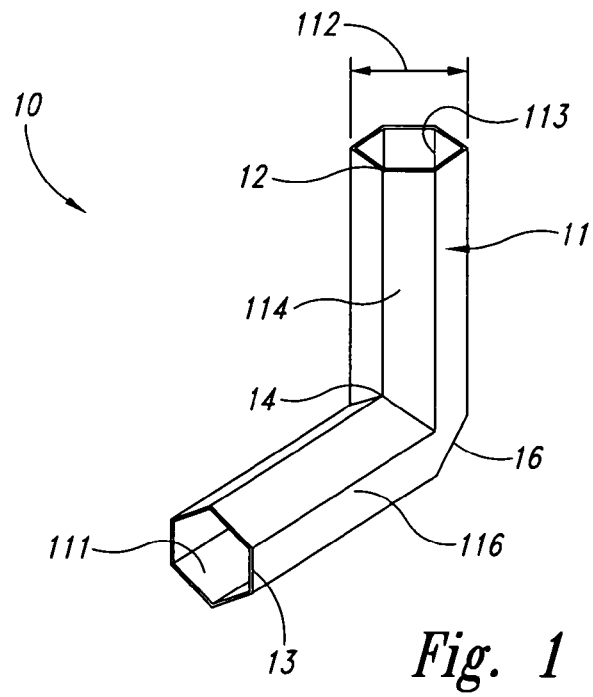
FIG. 1 is a perspective view of a right angle light diverter according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a right angle light diverter that enables bending a light beam at a right angle as well as producing and maintaining a homogenous profile of a light beam while redistributing the optical energy. An embodiment of the present invention provides a right angle light diverter that is suitable for, but not limited to, applications in aircraft industry, both military and commercial. The right angle light diverter as in one embodiment of the present invention may be used, for example, in connection with airborne laser programs, with airborne tactical laser programs, in commercial airplanes, and in military jets, for example, to replace current fiber optic splitters and other fiber optic components, such as a homogenizer.

In one embodiment, the present invention provides a right angle light diverter that may be manufactured as a one-piece device using an electroforming process. During the electroforming process a thin layer of highly reflective material, such as silver or gold, is electroplated to a mandrel, which may be a solid aluminum male pattern, followed by a thicker layer of a harder structural material, such as nickel, before the mandrel may be dissolved in an acid bath. Using the electroforming process to manufacture the right angle light diverter as in one embodiment of the present invention provides a fiber optic component having a highly reflective optical coating protected by a sturdy outer shell. This is an advantage over prior art hexagonal glass rods that are very fragile and have the reflective coating applied to the outside. Furthermore, using the electroforming process allows manufacturing the right angle light diverter as in one embodiment of the present invention at a fraction of the cost of the prior art hexagonal glass rod.

In one embodiment, the present invention provides a right angle light diverter that may have the shape of a hexagonal tube that is bent at a right angle and that includes reflection section across from the bending point having a 45° angle. The hexagonal shape of the tube as in one embodiment of the present invention enables an incoming Gaussian profile light beam to be converted to a homogenized light beam. The highly reflective reflection section across from the bending point having a 45° angle, as in one embodiment of the present invention, enables maintaining the homogeneous profile of the light beam while diverting the light beam at a right angle and, further, may eliminate the need for any additional optics as currently used for diverting the light beam. In prior art, no fiber optic component exists that enables diverting the incoming light beam at a right angle while producing and maintaining a homogenous profile of the light beam. The hexagonal glass rod currently used is a straight glass rod and, therefore, does not enable diverting the direction of the incoming light beam. By providing the highly reflective coating inside the hexagonal tube of the right angle light diverter as in one embodiment of the present invention not only optics currently used may be eliminated, but also the complexity, acquisition, and production costs may be reduced compared to prior art fiber optic components for diverting or homogenizing a light beam. Still further, the highly reflective coating inside the hexagonal tube as in one embodiment of the present invention may almost completely eliminate the loss of optical energy typically found with prior art fiber optic components for diverting a light beam. By designing the right angle light diverter as in one embodiment of the present invention to have an input port and an output port that have a hexagonal cross-section, no critical alignment of the input optical fibers or light source to the hexagonal tube is necessary as currently needed with prior art fiber optic components for light diversion or homogenizing.

In one embodiment, the present invention provides a right angle optical splitter that may allow a single input light beam to be homogenized and then to be diverted at 90° angles to multiple outputs. In prior art, no fiber optic component exists that allows homogenizing and splitting of a light beam at the same time. Furthermore, by using prior art fiber optic components for splitting a light beam, it is not possible to split the incoming light beam at right angles and without loss of optical energy, as possible with the right angle optical splitter as in one embodiment of the present invention due to the sturdy hexagonal design and the highly reflective coating. By providing the optical splitter that has a hexagonal cross-section and includes a 45° reflection angle as in one embodiment of the present invention, the incoming light beam cannot only be diverted at right angles but may also maintain the homogenized profile created upon entering the hexagonal tube eliminating the need for an additional external homogenizer component. The incoming light beam may be split to provide an identical intensity of light to each of the outputs using the right angle optical splitter as in one embodiment of the present invention. It may also be possible to manufacture the right angle optical splitter as in one embodiment of the present invention with different materials for the highly reflective coating to enable splitting the incoming light beam into light beams having a non-identical intensity if desired by an application. For example, by electroplating each of the output sections of the hexagonal tube with a different highly reflective material having different optical indexes, the 100% incoming optical energy could be divided into about 70% optical energy provided to a first output port and about 30% optical energy provided to a second output port. The highly reflective coating inside the hexagonal tube may further eliminate the loss of optical energy almost completely. According to one embodiment of the present invention, different materials, such as gold or silver, may be used for the highly reflective coating for each right angle diverter depending on the wavelength of the light source, such as an ultraviolet, visible light, or infrared light source. The right angle optical splitter as in one embodiment of the present invention may also be used to combine the optical signal from two or more fibers into a single fiber.

Figure 2:
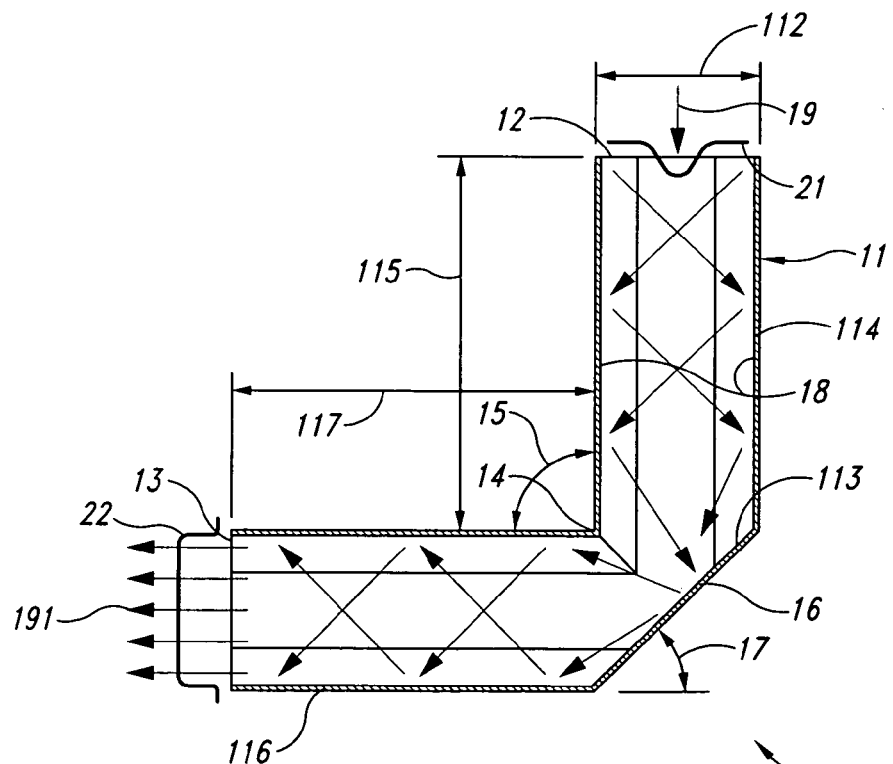
FIG. 2 is a cross-sectional view of a right angle light diverter according to one embodiment of the present invention.

Referring now to FIGS. 1 and 2, a right angle light diverter 10 is illustrated according to one embodiment of the present invention. The right angle light diverter 10 may be a hexagonal tube 11 that is bent at a right angle 15 and may include an input port 12, an input section 114 having a length 115, a reflection section 16, an output section 116 having a length 117, and an output port 13. The tube 11 may have a hexagonal cross-section 111, a diameter 112, and an inside surface 113. A highly reflective coating 18 may be applied to the inside surface 113 of the hexagonal tube 11. The highly reflective coating 18 may have a reflectivity of at least 99%. The input port 12 and the output port 13 may be located at opposite ends of the hexagonal tube 11 and may be positioned in a right angle 15. The input section 114 may follow the input port 12 and the output section 116 may precede the output port 13. The input section 114 and the output section 116 may intersect at the bending point 14 forming a right angle 15. The input port 12 and the output port 13 may receive an optical fiber or an optical cable that contains a plurality of optical fibers. The tube 11 may be bent at the right angle 15 and a bending point 14 may be located where the input section 114 and the output section 116 meet and form the right angle 15. The length 115 of the input section 114 and the length 117 of the output section 116 of the tube 11 may be identical. The ratio of the diameter 112 of the tube 11 to the sum of the length 115 of the input section 114 and the length 117 of the output section 116 may be at least 1 to 5. For example, if the diameter 112 of the tube is about 1 cm, then the length 115 of the input section 114 plus the length 117 of the output section 116 need to be at least 5 cm, while the length 115 of the input section 114 and the length 117 of the output section 116 would be at least 2.5 cm each. The reflection section 16 may be located across from the bending point 14, as shown in FIG. 2. The reflection section 16 may be positioned at a 45° reflection angle 17. Since the reflection section 16 may be covered with the highly reflective coating 18 as may be the remaining inside surface 113 of the tube 11, the reflection section 16 may have an at least 99% reflective inner surface. Due to the highly reflective coating 18 on the inside surface 113 of the tube 11, a light beam 19 may pass through the right angle light diverter 10 almost without any loss of optical energy.

The right angle light diverter 10 may be manufactured as a single piece using an electroforming process as described in the co-pending United States patent application: "Hex Tube Light Homogenizer System and Method", Ser. No. 10/744,922, filed Dec. 23, 2003, hereby incorporated by reference. During the electroforming process, a thin layer of highly reflective material, such as silver or gold, may be electroplated to a mandrel, which may be a solid aluminum male pattern, forming a highly reflective coating 18 followed by a thicker layer of a harder structural material, such as nickel, before the mandrel may be dissolved in an acid bath. The mandrel may be the male pattern of the right angle light diverter 10 including all structural elements, such as the hexagonal cross-section 11, the bending point 14, the right angle 15, the reflection section 16, and the 45° reflection angle 17.

An incoming light beam 19 may typically have a Gaussian profile 21. Upon entering the input port 12, the Gaussian profile 21 of the incoming light beam 19 may be converted to a homogenized profile 22 due to the hexagonal cross-section 111 of the tube 11 and the highly reflective coating 18. Due to the highly reflective coating 18, the incoming light beam 19 may pass through the tube 11 losing less than 1% of its optical energy. The incoming light beam 19 may be evenly diverted at the reflection section 16. The reflection section 16 may further redistribute the optical energy of the light beam 19 almost without any energy loss. The right angle light diverter 10 may divert the incoming light beam 19 at a right angle. Since the output section 116 of the tube 11 may have the same hexagonal cross-section 111 as the input section, the homogenized profile 22 of the light beam 19 may be maintained until the light beam 19 reaches the output port 13, as shown in FIG. 2. A light beam 191 may exit the output port 13 at a 90° angle relative to entering the input port 12 having a homogenized profile 22 and with almost 100% of the optical energy with which the light beam 19 entered the input port 12. Optical fibers, such as fiber optic cables, or any other light source (not shown) may be inserted into the input port 12 to provide the incoming light beam 19. Optical fibers, such as fiber optic cables, or other fiber optic components (not shown) may be inserted into the output port 13 to receive the homogenized and diverted light beam 191. Depending on the material that may be used for the highly reflective coating 18, the right angle light diverter 10 may be used to homogenize and divert light over a wide range of wavelength, such as ultra violet, and visible to infrared.

Figure 3:
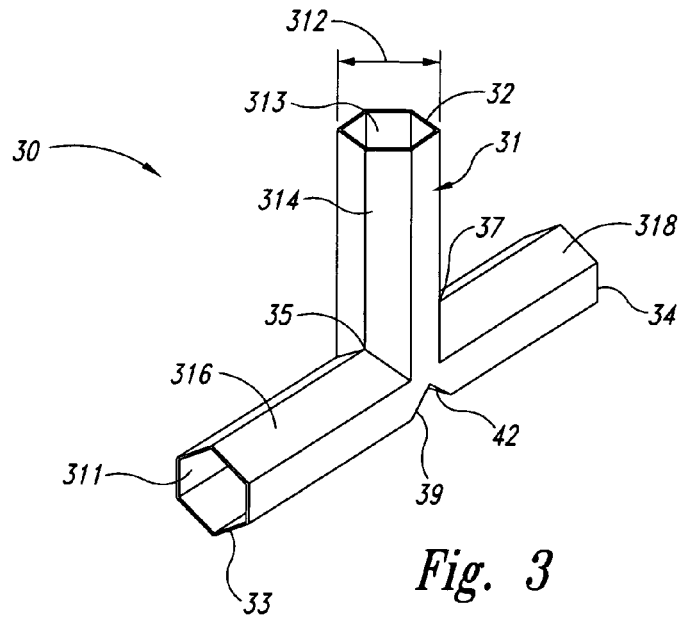
FIG. 3 is a perspective view of a two-way right angle optical splitter according to another embodiment of the present invention.
Figure 4:
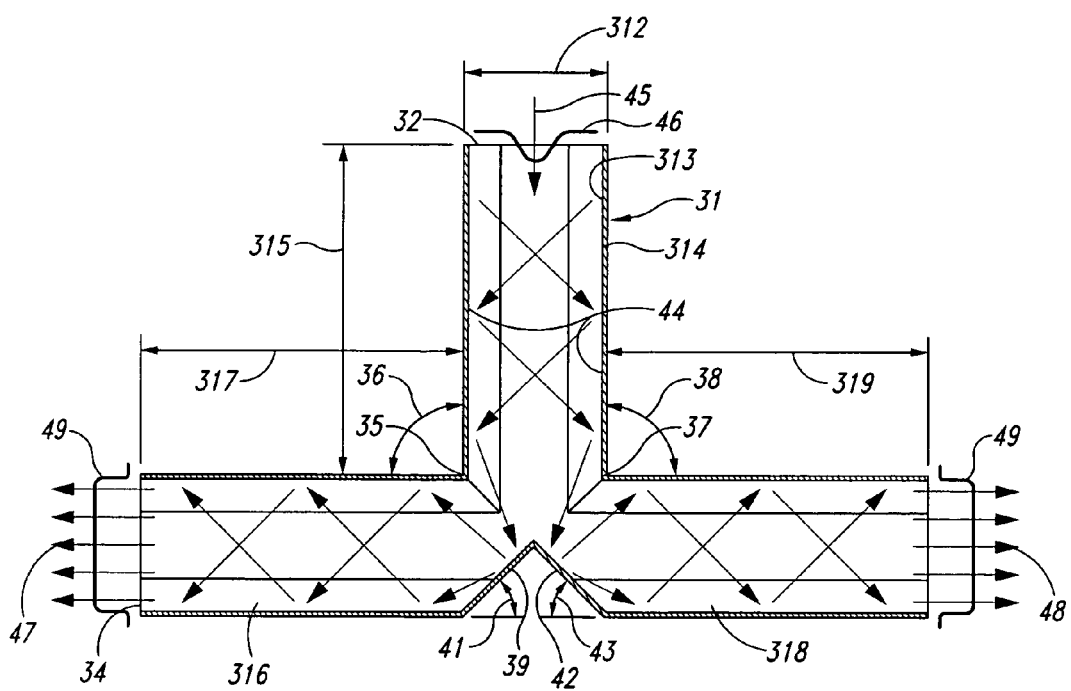
FIG. 4 is a cross-sectional view of a two-way right angle optical splitter according to one embodiment of the present invention.

Referring now to FIGS. 3 and 4, a two-way right angle optical splitter 30 is illustrated according to another embodiment of the present invention. The two-way right angle optical splitter 30 may be a hexagonal tube 31 that may include an input port 32, an input section 314 having a length 315, a first reflection section 39, a first output section 316 having a length 317, a first output port 33, a second reflection section 42, a second output section 318 having a length 319, and a second output port 34. The tube 31 may have hexagonal cross-section 311, a diameter 312, and an inside surface 313. The two-way right angle optical splitter 30 may be manufactured in one piece using an electroforming process as described above (FIGS. 1 and 2). A highly reflective coating 44 may be located on the inside surface 313 of the hexagonal tube 31. The highly reflective coating 18 may have a reflectivity of at least 99%. The input section 314 may follow the input port 32, the first output port 33 may follow the first output section 316, and the second output port 34 may follow the second output section 318, as illustrated in FIG. 4. The input port 32 may be positioned in a first right angle 36 to the first output port 33 and in a second right angle 38 to the second output port 34. The first output port 33 may be positioned across from the second output port 34, such that the input section 314, the first output section 316, and the second output section 316 form a "T", as shown in FIGS. 3 and 4. It may further be possible to position the first output section 314 relative to the second output section 316 such that they form any other angle in the range of 0° to 180° as might be required by an application. The input port 32, the first output port 33, and the second output port 34 may receive an optical fiber or an optical cable that contains a plurality of optical fibers. A first bending point 35 may be located where the input section 314 and the first output section 316 of the tube 31 intersect and form the first right angle 36. A second bending point 37 may be located where the input section 314 and the second output section 318 of the tube 31 intersect and form the second right angle 38. The length 315 of the input section 314, the length 317 of the first output section 316, and the length 319 of the second output section 318 of the tube 31 may be identical. The ratio of the of the diameter 312 of the tube 31 to the sum of the length 315 of the input section 314 and the length 317 of the first output section 316 may be at least 1/5. Also, the ratio of the of the diameter 312 of the tube 31 to the sum of the length 315 of the input section 314 and the length 319 of the second output section 318 may be at least 1/5. The first reflection section 39 may be located across from the first bending point 35, as shown in FIG. 4. The second reflection section 42 may be located across from the second bending point 37, as shown in FIG. 4. The first reflection section 39 may be positioned at a first 45° reflection angle 41. The second reflection section 42 may be positioned at a second 45° reflection angle 43. As shown in FIG. 4, the first 45° reflection angle 41 and the second 45° reflection angle 43 may be positioned opposite to each other. Since the reflection sections 39 and 42 may be covered with a highly reflective coating 44 as may be the remaining inside surface 313 of the tube 31, the reflection sections 39 and 42 may have an at least 99% reflective inner surface. Due to the highly reflective coating 44 on the inside surface 313 of the tube 31, a light beam 45 may pass through the two-way right angle optical splitter 30 with less than 1% loss of its optical energy.

An incoming light beam 45 may typically have a Gaussian profile 46. Upon entering the input port 32, the Gaussian profile 46 of the incoming light beam 44 may be converted to a homogenized profile 49 due to the hexagonal cross-section 311 of the tube 31 and the highly reflective coating 44. Due to the highly reflective coating 44, the incoming light beam 45 may pass through the tube 31 losing less than 1% of its optical energy. The incoming light beam 45 may be evenly split into a first outgoing light beam 47 and a second outgoing light beam 48 at the reflection sections 39 and 42, respectively. The reflection sections 39 and 42 may further split the optical energy of the incoming light beam 45 in half and redistribute the optical energy of the light beam 45. The reflection section 39 may also divert the outgoing light beam 47 at the first right angle 36 and the reflection section 42 may also divert the outgoing light beam 48 at the second right angle 38. Since the first output section 316 and the second output section 318 of the tube 31 may have the same hexagonal cross-section 311 as the input section 314, the homogenized profile 49 of the light beam 45 may be maintained until the first outgoing light beam 47 reaches the first output port 33 and until the second outgoing light beam 48 reaches the second output port 34, as shown in FIG. 4. The light beam 47 may exit the first output port 33 at a 90° angle 36 relative to the light beam 45 entering the input port 32 having a homogenized profile 49 and with about 50% of the optical energy with which the light beam 45 entered the input port 32. The light beam 48 may exit the second output port 34 at a 90° angle 38 relative to the light beam 45 entering the input port 32 having a homogenized profile 49 and with about 50% of the optical energy with which the light beam 45 entered the input port 32. The two-way right angle optical splitter 30 may be designed such that the loss of optical energy of the incoming light beam 45 is less than 1% while traveling from the input port 32 to the first output port 33 and the second output port 34. An optical fiber, fiber optic cables, or any other light source (not shown) may be inserted into the input port 32 to provide the incoming light beam 19. Optical fibers, fiber optic cables, or other fiber optic components (not shown) may be inserted into the first output port 33 to receive the homogenized and diverted first outgoing light beam 47 and into the second output port 34 to receive the homogenized and diverted second outgoing light beam 48. Depending on the material that may be used for the highly reflective coating 44, for example, gold, silver or their alloys, the two-way right angle optical splitter 30 may be used to homogenize and divert light over a wide range of wavelength, such as ultra violet, and visible to infrared. Furthermore, it may be possible to split the incoming light beam 45 unevenly by applying a highly reflective coating 44 to the second output section 318 and the second reflection section 42 having optical characteristics different from the highly reflective coating 44 applied to the first output section 316 and the first reflection section 39. It may still further be possible to use the two-way right angle optical splitter 30 to combine the optical signal from two fibers into a single fiber by receiving a first incoming light beam (not shown) at the first output port 33 and a second incoming light beam (not shown) at the second output port 34, by combining the optical energy of the first incoming light beam and the second incoming light beam with the reflection sections 39 and 42, and by providing a homogenized light beam having the combined optical energy of the first incoming light beam and the second incoming light beam to the input port 33.

Figure 5:
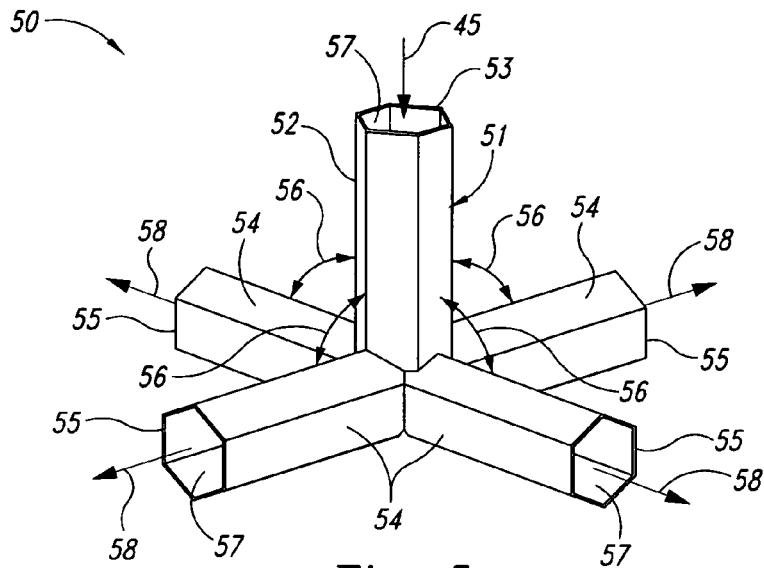
FIG. 5 is a perspective view of a four-way right angle optical splitter according to one embodiment of the present invention.

Referring now to FIG. 5, a four-way right angle optical splitter 50 is illustrated according to one embodiment of the present invention. The four-way right angle optical splitter 50 may be an example for a variation of the two-way right angle optical splitter 30 illustrated in FIGS. 3 and 4. The four-way right angle optical splitter 50 may have the shape of a hexagonal tube 51 and may include an input section 52 including an input port 53, and four output sections 54 each including an output port 55. The four-way right angle optical splitter 50 may be manufactured in one piece using an electroforming process as described above (FIGS. 1 and 2). The four output sections 54 may intersect with the input section 52 at a right angle 56. The four output sections 54 may further be evenly (shown in FIG. 5) or unevenly (not shown) positioned around the input section 52. The number of output sections 54 is not limited to four and may be, for example, 3, 5, or 6. Since the input section 52 and the output section 54 of the hexagonal tube 51 may have the same hexagonal cross-section 57, an incoming light beam 45 having a Gaussian profile may be homogenized (as shown in FIG. 4). The incoming light beam 45 may be split into four outgoing light beams 58 if four output sections 54 intersect with the input section 52, as shown in FIG. 5. The four-way right angle optical splitter 50 may further include a reflection section (not shown) for each output section 54. One reflection section may connect the input section 52 with one of the output sections 54 in a 45° angle. The reflection sections may assist in splitting and diverting the incoming light beam 45 (as shown for the reflection sections 39 and 42 in FIG. 4). Each of the four outgoing light beams 58 may have a fourth of the optical energy of the incoming light beam 45 if the energy is evenly distributed among the four output sections 54 shown in FIG. 5. It may further be possible to distribute the optical energy of the incoming light beam 45 unevenly among the output sections 54 by applying different highly reflective coatings 44 to each of the output sections 54. By using the right angle optical splitter 50, the incoming light beam 45 may be split evenly or unevenly into outgoing light beams 58 and the number of the outgoing light beams 58 may be identical with the number of the output sections 54 that intersect with the input section 52 at a right angle 56. An optical fiber, a fiber optic cable, or any other light source (not shown) may be inserted into the input port 53 to provide the incoming light beam 45. Optical fibers, fiber optic cables, or other fiber optic components (not shown) may be inserted into the four output ports 55 to receive the splitted, homogenized, and diverted outgoing light beams 58. It may still further be possible to use the four-way right angle optical splitter 50 to combine the optical signal from four fibers into a single fiber using the input port 53 as an output port and by using the output ports 55 as input ports.

Figure 6:
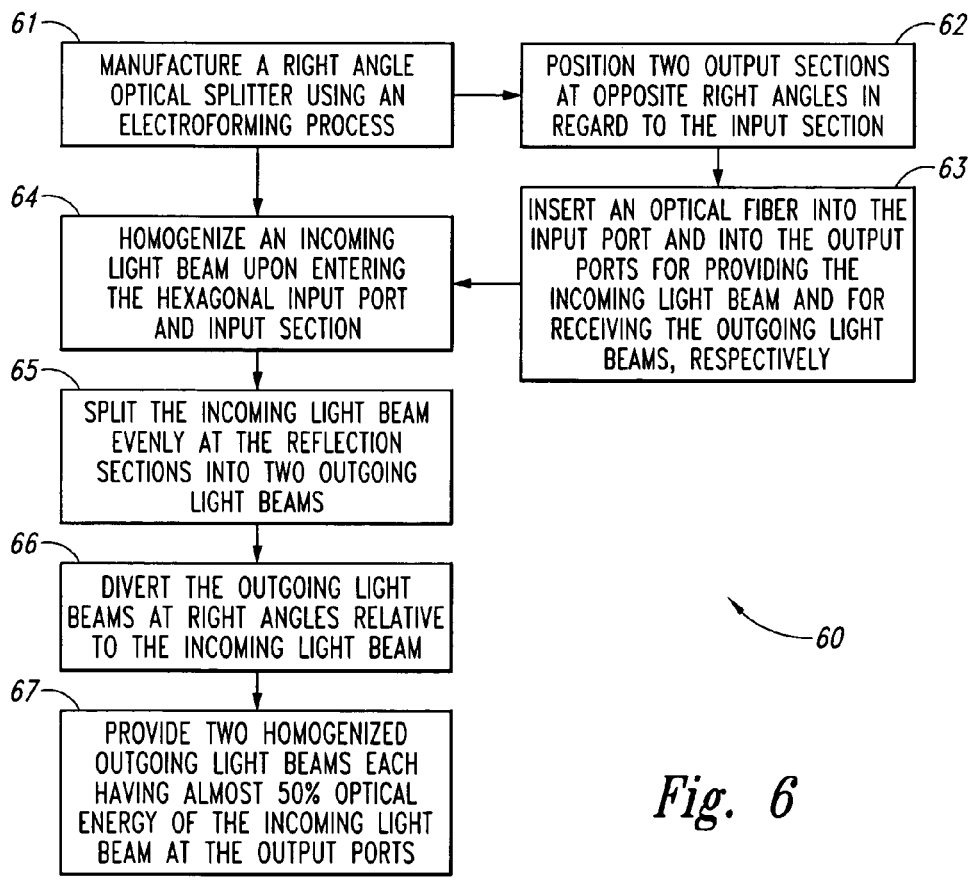
FIG. 6 is a flow chart of a method for splitting a light beam at right angles according to another embodiment of the present invention.

Referring now to FIG. 6, a method 60 for splitting a light beam at a right angle is illustrated according to another embodiment of the present invention. The method 60 for splitting a light beam may include manufacturing a two-way right angle optical splitter 30 (shown in FIGS. 3 and 4) using an electroforming process in step 61. The step 61 may include positioning two output sections, for example the output sections 316 and 318, at opposite right angles 36 and 38 in regard to the input section 314, as shown in FIGS. 3 and 4, in step 62. In step 63, an optical fiber or other light source may be inserted into the input port 32 for providing the incoming light beam 45 and optical fibers may be inserted into the output ports 33 and 34 for receiving the outgoing light beams 47 and 48 (FIG. 4). In step 64, the incoming light beam 45 may be homogenized upon entering the hexagonal input port 32 and the hexagonal input section 114 (FIGS. 3 and 4). Splitting the incoming light beam 45 evenly at the reflection sections 39 and 42 (FIG. 4) into two outgoing light beams 47 and 48 may follow in step 65. The outgoing light beams 47 and 48 may further be diverted at the reflections sections 39 and 42, respectively, at a right angle, for example the right angle 36 and the right angle 38, in step 66. Step 67 may include providing two homogenized outgoing light beams 47 and 48, each having almost 50% optical energy of the incoming light beam 45, at the output ports 34 and 35, respectively (FIG. 4). The right angle optical splitter, for example, the four-way right angle optical splitter 50 (FIG. 5), may be manufactured to include more than two output sections (for example, output sections 54 including output ports 55, as shown in FIG. 5) each having an output port. The two-way right angle optical splitter 30 (shown in FIGS. 3 and 4) or the four-way right angle optical splitter 50 (FIG. 5) may be manufactured in step 61 to have optically different high reflective coatings 18 (FIGS. 1 and 2) applied to each reflection section (for example, the reflection sections 39 and 42, FIG. 4) and to each output section (for example, output section 316 and 318, FIGS. 3 and 4) to enable splitting the incoming light beam 45 unevenly in step 65. The right angle optical splitter may further be manufactured in step 61 as a right angle light diverter 10 to include the input port 12 and only one output port 13, as shown in FIGS. 1 and 2. In this case, step 65 (splitting the incoming light beam) may not be performed. The incoming light beam 19 may still be homogenized in step 64 and may be diverted in step 66.

It should be understood, of course, that the foregoing relates to exemplary embodiments of the invention and that modifications may be made without departing from the spirit and scope of the invention as set forth in the following claims.

We claim:

1. A method for homogenizing and diverting a light beam, comprising the steps of:
   manufacturing a hollow tube having a hexagonal cross-section as a single piece using an electroforming process by electroplating a thin layer of a highly reflective coating to a solid male pattern followed by a thicker layer of a harder structural material before dissolving said male pattern in an acid bath;
   homogenizing an incoming light beam having a Gaussian profile upon directly entering an open hexagonal input port of said tube from a light transmitting device utilizing said hexagonal cross-section and said highly reflective coating inside said hollow tube;
   diverting said homogenized light beam at a right angle at a reflection section integrated within said tube across a single 90° bending point and directing said homogenized light beam at said reflection section towards an open hexagonal output port;
   maintaining homogenization of said outgoing light beam with said hexagonal cross-section extending from said input port to said reflection section and from said reflection section to said output port and by positioning said reflection section at a 45° reflection angle;
   coupling said homogenized and diverted outgoing light beam directly into a light transmitting device; and
   keeping loss of optical energy from said input port to said output port below about 1% with said highly reflective coating.

2. The method of claim 1, further including the steps of:
   converting the Gaussian profile of said incoming light beam to a homogenized profile upon entering said input port; and
   maintaining said homogenized profile up to said output port.

3. The method of claim 1, further including the steps of:
   directly coupling a first optical fiber to said input port, said first optical fiber providing said light beam directly entering said input port; and
   directly coupling a second optical fiber to said output port, said second optical fiber directly receiving said homogenized and diverted outgoing light beam.

* * * * *